(12) United States Patent
Ames et al.

(10) Patent No.: US 8,225,915 B2
(45) Date of Patent: Jul. 24, 2012

(54) DUAL CLUTCH TORQUE CONVERTER CONTROL SYSTEM

(75) Inventors: David C. Ames, Avon, IN (US); Charles F. Long, Pittsboro, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 673 days.

(21) Appl. No.: 12/413,230

(22) Filed: Mar. 27, 2009

(65) Prior Publication Data
US 2009/0280954 A1   Nov. 12, 2009

Related U.S. Application Data

(60) Provisional application No. 61/051,776, filed on May 9, 2008.

(51) Int. Cl.
F16D 25/10 (2006.01)
F16H 45/02 (2006.01)
F16H 45/00 (2006.01)

(52) U.S. Cl. .......... 192/3.25; 192/3.3; 192/48.611; 192/85.63

(58) Field of Classification Search ............ 192/3.25, 192/3.26
See application file for complete search history.

(56) References Cited

U.S. PATENT DOCUMENTS

| 5,616,093 A * | 4/1997 | Long et al. ............ 475/120 |
| 2004/0188209 A1* | 9/2004 | Leber ................ 192/3.25 |
| 2010/0035722 A1* | 2/2010 | Long et al. ............ 477/62 |

FOREIGN PATENT DOCUMENTS

| DE | 3410226 C2 | 9/1985 |
| DE | 19717355 B4 | 11/1997 |

* cited by examiner

*Primary Examiner* — Rodney Bonck (57) ABSTRACT

A system for controlling a dual clutch torque converter that allows for independent control of the dual clutches includes a first valve assembly, a second valve assembly, a first solenoid, and a second solenoid. The first valve assembly is operable to control whether the dual clutches are released, trimmed, or engaged. The second valve assembly is operable to control which of the dual clutches are released, trimmed, or engaged. The first solenoid is operable to control the position of the first valve assembly and the second solenoid is operable to control the position of the second valve assembly.

19 Claims, 6 Drawing Sheets

FIG. 6

DUAL CLUTCH TORQUE CONVERTER CONTROL SYSTEM

CROSS-REFERENCE TO RELATED APPLICATIONS

This application claims the benefit of U.S. Provisional Application No. 61/051,776, filed on May 9, 2008. The disclosure of the above application is incorporated herein by reference.

FIELD

The invention relates generally to a control system for a dual clutch torque converter, and more particularly to a control system having a trim system multiplexed with a converter valve to selectively control dual clutches in a torque converter.

BACKGROUND

The statements in this section merely provide background information related to the present disclosure and may or may not constitute prior art.

Torque converters are well known in the art and generally include three rotating elements: a pump, a turbine, and a stator. The pump is mechanically driven by a prime mover, such as an internal combustion engine or electric motor. The turbine is mechanically coupled to an output shaft and is driven by fluid flow pumped by rotation of the pump. The stator is interposed between the pump and turbine and alters fluid flow returning from the turbine to the pump in order to multiply torque. In a dual clutch torque converter, a pair of clutches are used to selectively mechanically connect the different components of the torque converter. The pair of clutches typically include a lock-up clutch and a pump clutch. The lock-up clutch is operable to directly mechanically couple the pump of the torque converter to the turbine of the torque converter. The pump clutch is operable to mechanically couple and decouple the engine output with the pump of the torque converter.

The addition of multiple clutches allows the dual clutch torque converter to operate in various states. However, independently controlling two separate clutches requires extensive valve and solenoid hydraulic controls. The addition of these valves and solenoids increases the cost and weight of the hydraulic control system of the transmission. Accordingly, there is room in the art for a system for controlling a dual clutch torque converter that allows for independent control of the dual clutches and which minimizes the use of valves and solenoids.

SUMMARY

The present invention provides a system for controlling a dual clutch torque converter that allows for independent control of the dual clutches. The system includes a first valve assembly, a second valve assembly, a first solenoid, and a second solenoid. The first valve assembly is operable to control whether the dual clutches are released, trimmed, or engaged. The second valve assembly is operable to control which of the dual clutches are released, trimmed, or engaged. The first solenoid is operable to control the position of the first valve assembly and the second solenoid is operable to control the position of the second valve assembly.

In one aspect of the present invention, the first solenoid is a variable bleed solenoid.

In another aspect of the present invention, the second solenoid is an on/off solenoid.

In yet another aspect of the present invention, the first valve assembly controls the pressure of a fluid flow to the second valve assembly, and the second valve assembly directs the fluid flow to one of the dual clutches.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
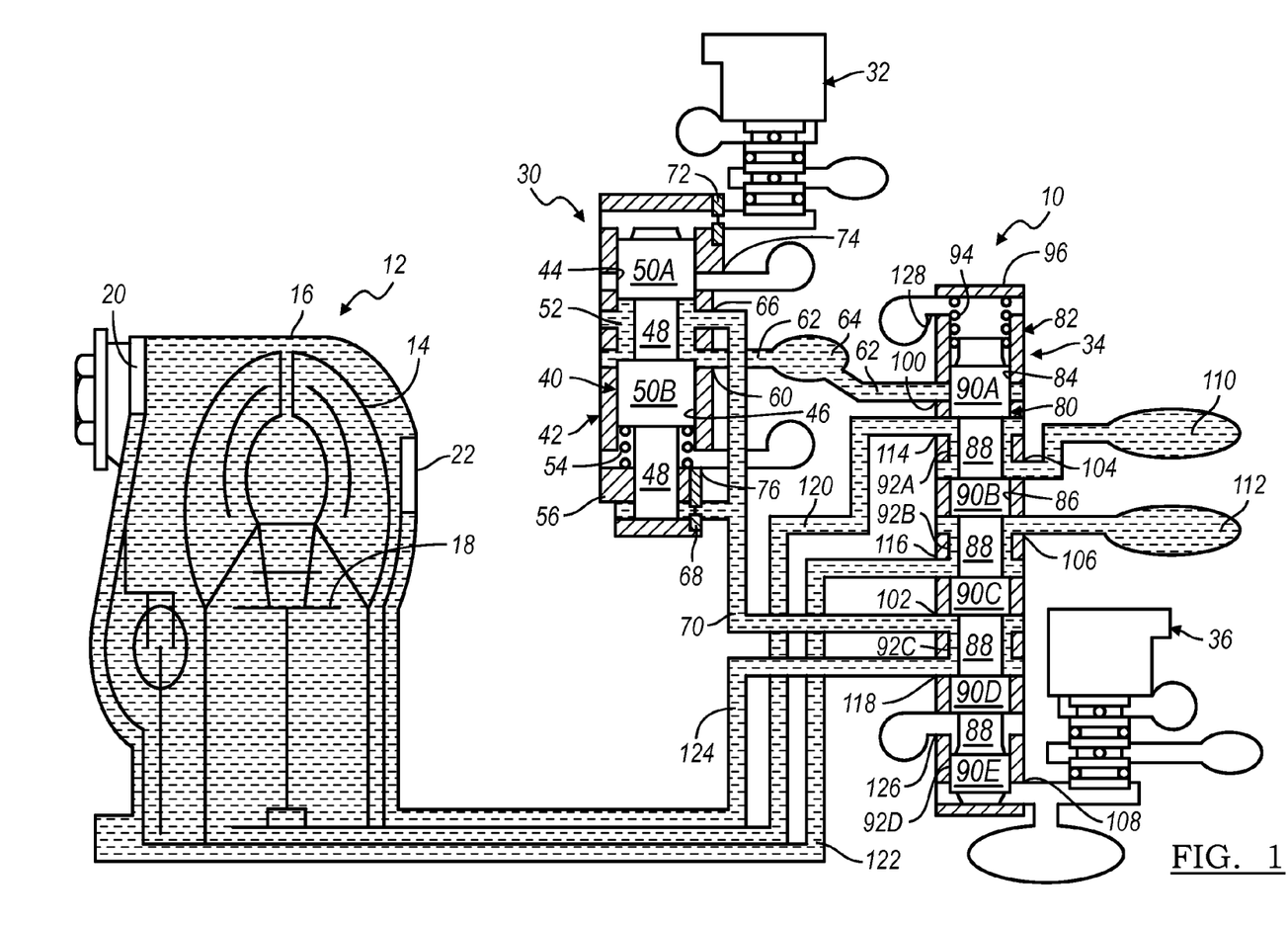
FIG. 1 is a schematic diagram of an embodiment of a hydraulic control system according to the principles of the present invention commanding a lock-up clutch and a pump clutch released.

With reference to FIG. 1, a hydraulic control system for use in a transmission in a motor vehicle is illustrated schematically and generally indicated by reference number 10. The hydraulic control system 10 is operable to control an exemplary dual clutch torque converter 12. The dual clutch torque converter 12 generally includes a pump 14, a turbine 16, a stator 18, a lock-up clutch 20, and a pump clutch 22. The pump 14 is selectively coupled to and driven by a prime mover (not shown), such as a combustion engine or an electric motor. The turbine 16 is fluidly driven by the pump 14. The turbine 16 is coupled to and drives an output shaft (not shown) that communicates with the transmission (not shown). The stator 18 is located between the pump 14 and the turbine 16 and is used to multiply torque within the torque converter 12. The lock-up clutch 20 is operable to selectively mechanically couple the turbine 16 to the pump 14. The pump clutch 22 is operable to selectively mechanically couple the pump 14 to the output of the prime mover.

During operation of the torque converter 12, the lock-up clutch 20 and the pump clutch 22 are in one of at least three positions: a released position, a trimmed position, and a fully applied position. When in the released position, the lock-up clutch 20 and the pump clutch 22 are disengaged and are not actively transferring torque. In the trimmed position, the lock-up clutch 20 and the pump clutch 22 are actively transferring less than full torque and are not fully applied. In other words, while in the trimmed position the clutches 20, 22 are allowed to slip. In the fully applied position, the lock-up clutch 20 and the pump clutch 22 are fully engaged and provide a direct mechanical connection in order to fully transfer torque. Both the lock-up clutch 20 and the pump clutch 22 are in an engaged condition when pressurized hydraulic fluid has not been delivered to the clutches 20, 22. The positions of the lock-up clutch 20 and the pump clutch 22 are independently controlled by the hydraulic control system 10, as will be described in greater detail below.

The hydraulic control system 10 includes a first or trim valve assembly 30, a first or trim solenoid 32, a second or converter valve assembly 34, and a second or converter solenoid 36. The trim valve assembly 30 is used to control the positions or engagement of the lock-up clutch 20 and the pump clutch 22. The trim valve assembly 30 includes a trim valve 40 located within a valve body 42. More specifically, the valve body 42 includes an inner surface 44 that defines a bore 46 and the trim valve 40 is slidably supported within the bore 46. The valve body 42 is preferably formed as an integral component of the transmission. The trim valve 40 includes a central body 48 that extends along a length of the bore 46. A plurality of lands 50A-B extend from the central body 48 and engage the inner surface 44 of the bore 46. The lands 50A-B are spaced along the length of the central body 48 and cooperate with the bore 46 to define a fluid chamber 52. The trim valve 40 is moveable within the bore 46 between a release position, shown in FIG. 1, a trim position, shown in FIGS. 2 and 4, and an apply position, shown in FIGS. 3 and 5. A biasing member 54, such as a spring, is located within the bore 46 between the trim valve 40 and a seat 56. The seat 56 is fixed relative to the valve body 42. The biasing member 54 biases the trim valve 40 to the apply position.

The valve body 42 further defines a plurality of ports that connect with a plurality of fluid communication channels or passages. In the example provided, the valve body 42 includes a line pressure inlet port 60 that communicates with the bore 46. The line pressure inlet port 60 communicates with a line pressure fluid communication channel 62. The line pressure fluid communication channel 62 communicates with a line pressure hydraulic fluid source 64 that is operable to provide a first or line pressurized fluid flow of hydraulic fluid. A first outlet port 66 communicates with the bore 46 at a location proximate to the line pressure inlet port 60 and a feedback port 68 communicates with the bore 46 at an end of the trim valve 40 proximate to the biasing member 54. The seat 56 separates the bore 46 between the feedback port 68 and the first outlet port 66. The first outlet port 66 and the feedback port 68 communicate with a first fluid communication channel 70. The valve body 42 further defines a trim solenoid inlet port 72 that communicates with the bore 46 at an end of the trim valve 40 opposite the biasing member 54. The trim solenoid inlet port 72 communicates with the trim solenoid 32. Finally, a plurality of exhaust ports 74 and 76 communicate with the bore 46 at various locations along the length of the bore 46. In the example provided, exhaust port 74 is located between the trim solenoid inlet port 72 and the first outlet port 66 and exhaust port 76 is located between the seat 56 and the line pressure inlet port 60. It should be appreciated that various other arrangements of fluid communication channels and ports may be employed without departing from the scope of the present invention.

The trim solenoid 32 is employed to control or move the trim valve 40 between the release, trim, and apply positions, as will be described in further detail below. The trim solenoid 32 is operable to provide a pressurized fluid flow to the solenoid port 72 of the trim valve assembly 30 in response to an input electrical current. The trim solenoid 32 is preferably a variable bleed solenoid, a force motor, or a pulse width modulation solenoid operable to provide a range of output pressures. However, it should be appreciated that the trim solenoid 32 may take various other forms without departing from the scope of the present invention.

The converter valve assembly 34 is used to control which of the lock-up clutch 20 and the pump clutch 22 are controlled by the trim valve assembly 30. The converter valve assembly 34 includes a converter valve 80 located within a valve body 82. More specifically, the valve body 82 includes an inner surface 84 that defines a bore 86 and the converter valve 80 is slidably supported within the bore 86. The valve body 82 is preferably formed as an integral component of the transmission. The converter valve 80 includes a central body 88 that extends along a length of the bore 86. A plurality of lands 90A-E extend from the central body 88 and engage the inner surface 84 of the bore 86. The lands 90A-E are spaced along the length of the central body 88 and cooperate with the bore 86 to define a plurality of fluid chambers 92A-D. The converter valve 80 is moveable within the bore 86 between a first position, shown in FIGS. 1, 2, and 3, a second position, shown in FIGS. 4 and 5. A biasing member 94, such as a spring, is located within the bore 86 between the converter valve 80 and a seat 96. The seat 96 is fixed relative to the valve body 82. The biasing member 94 biases the converter valve 80 to the first position.

The valve body 82 further defines a plurality of ports that connect with a plurality of fluid communication channels or passages. In the example provided, the valve body 82 includes a second line pressure inlet port 100, a trim valve inlet port 102, a coolant line inlet port 104, an overage line inlet port 106, and a converter solenoid inlet port 108. The second line pressure inlet port 100 is in communication with the bore 86 and with the line pressure fluid communication channel 62 and receives the first or line pressurized fluid flow of hydraulic fluid from the line pressure hydraulic fluid source 64. The trim valve inlet port 102 is in communication with the bore 86 and with the first fluid communication channel 70. The coolant line inlet port 104 is in communication with the bore 86 and with a coolant pressurized fluid source 110. The coolant pressurized fluid source 110 provides a second pressurized flow of hydraulic fluid from the coolant system of the transmission. However, it should be appreciated that the second pressurized flow of hydraulic fluid may come from other sources without departing from the scope of the present invention. The overage line inlet port 106 is in communication with the bore 86 and with an overage pressurized fluid source 112. The overage pressurized fluid source 112 provides a third pressurized flow of hydraulic fluid from a fluid return or overage system of the transmission. However, it should be appreciated that the third pressurized flow of hydraulic fluid may come from other sources without departing from the scope of the present invention. The converter solenoid inlet port 108 is in communication with the bore 86 and with the converter solenoid 36. The converter solenoid inlet port 108 is located at an end of the bore 86 opposite that of the biasing member 94.

The valve body 82 also includes a torque converter outlet port 114, a lock-up clutch outlet port 116, and a pump clutch outlet port 118. The torque converter outlet port 114 is in communication with the bore 86 and with a second fluid communication channel 120. The second fluid communication channel 120 communicates with the pump 14 and turbine 16 of the torque converter 12. The lock-up clutch outlet port 116 is in communication with the bore 86 and with a third fluid communication channel 122. The third fluid communication channel is in communication with the lock-up clutch 20. The pump clutch outlet port 118 is in communication with the bore 86 and with a fourth fluid communication channel 124. The fourth fluid communication channel 124 is in communication with the pump clutch 22. Finally, the valve body 82 defines a plurality of exhaust ports 126 and 128 that communicate with the bore 86 at various locations along the length of the bore 86. It should be appreciated that various other arrangements of fluid communication channels and ports may be employed without departing from the scope of the present invention.

The converter solenoid 36 is employed to control or move the converter valve 80 between the first and second positions, as will be described in further detail below. The converter solenoid 36 is operable to provide a pressurized fluid flow to the converter solenoid port 108 of the converter valve assembly 32 in response to an input electrical current. The converter solenoid 36 is preferably an on/off solenoid. However, it should be appreciated that the converter solenoid 36 may take various other forms without departing from the scope of the present invention.

The hydraulic control system 10 is operable to selectively apply, trim, and release the lock-up clutch 20 and the pump clutch 22 when desired. For example, during a reduced engine load at a stop, both the lock-up clutch 20 and the pump clutch 22 are released or unengaged. In this condition, the trim valve 40 is in the released position and the converter valve 80 is in the first position, as shown in FIG. 1. The trim solenoid 32 is providing an output pressure to the trim solenoid inlet port 72 sufficient to overcome the force of the biasing member 54 and the converter solenoid 36 is closed or off and not overcoming the force of the biasing member 94. The first pressurized fluid flow from the pressure line fluid source 64 passes through the line pressure inlet port 60, through the fluid chamber 52, out the first outlet port 66 to the trim valve inlet port 102, through fluid chamber 92C, out the pump clutch outlet port 118, and to the pump clutch 22. The first pressurized fluid flow contacts the pump clutch 22 and places the pump clutch 22 in the released condition. The second fluid flow from the coolant line source 110 passes through the coolant line inlet port 104, through fluid chamber 92A, out the torque converter outlet port 114, and to the torque converter 12. The third pressurized fluid flow from the overage line source 112 passes through the overage line inlet port 106, through fluid chamber 92B, out the lock-up clutch outlet port 116, and to the lock-up clutch 20. The third pressurized fluid flow contacts the lock-up clutch 20 and places the lock-up clutch 20 in the released condition.

Figure 2:
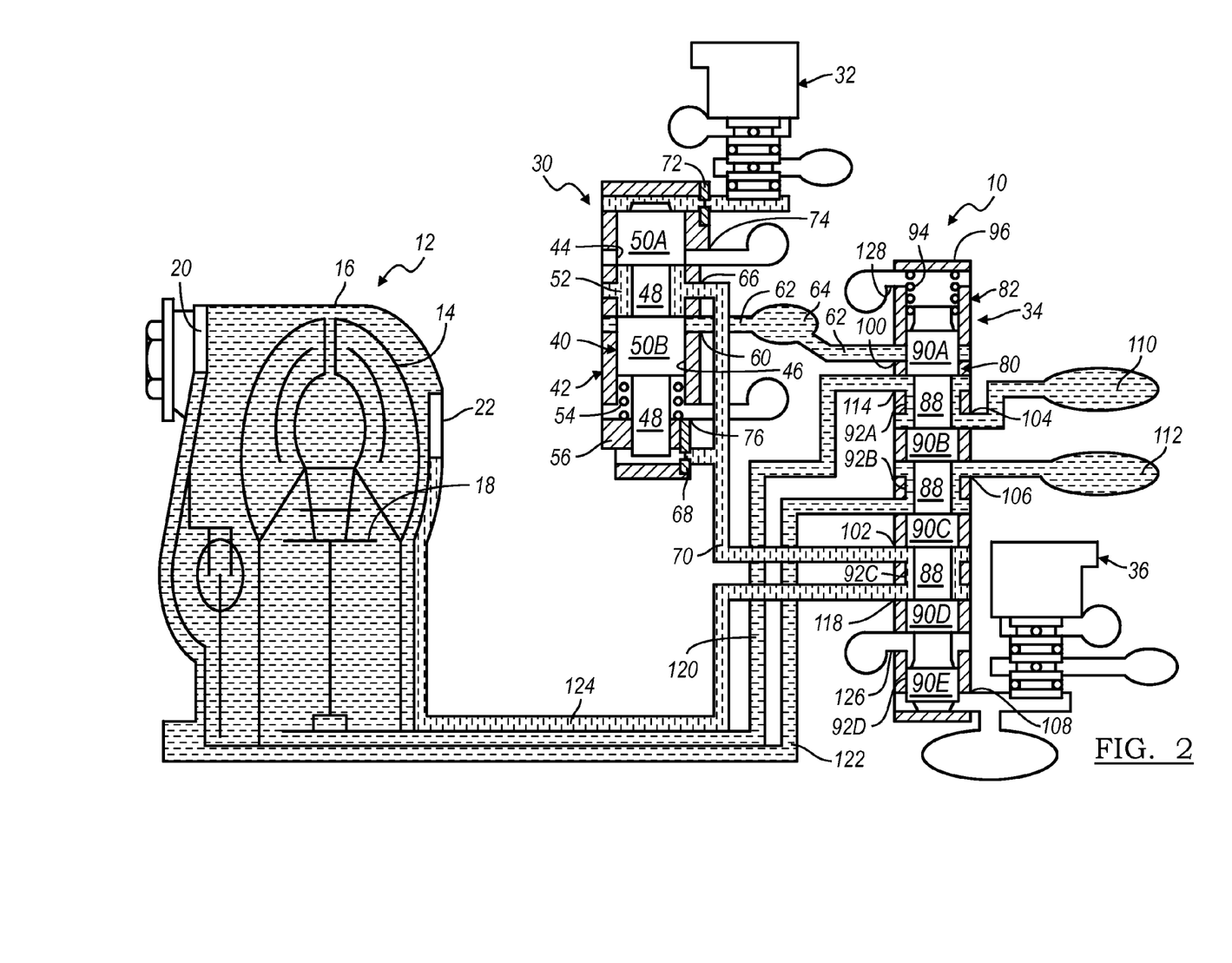
FIG. 2 is a schematic diagram of an embodiment of a hydraulic control system according to the principles of the present invention commanding a lock-up clutch released and a pump clutch trimmed.

In order to trim the pump clutch 22, the trim valve 40 is moved to the trim position, as shown in FIG. 2, by decreasing the output pressure from the trim solenoid 32. The trim valve 40 dithers or oscillates within the bore 46 such that the fluid chamber 52 alternately communicates with both the line pressure inlet port 60 and exhaust port 74. Additionally, hydraulic fluid flow from the first fluid communication channel 70 is diverted to the feedback inlet port 68 in order to engage an end of the trim valve 40 to provide a balancing pressure on the trim valve 40. The pressurized fluid flow from the line pressure source 64 is reduced before entering the first outlet port 66 when the trim valve 40 is in the trim position as a portion of the pressurized fluid flow is diverted through exhaust port 74. Accordingly, the first pressurized fluid flow delivered to the pump clutch 22 is reduced, and the pump clutch 22 is allowed to partially engage slip.

Figure 3:
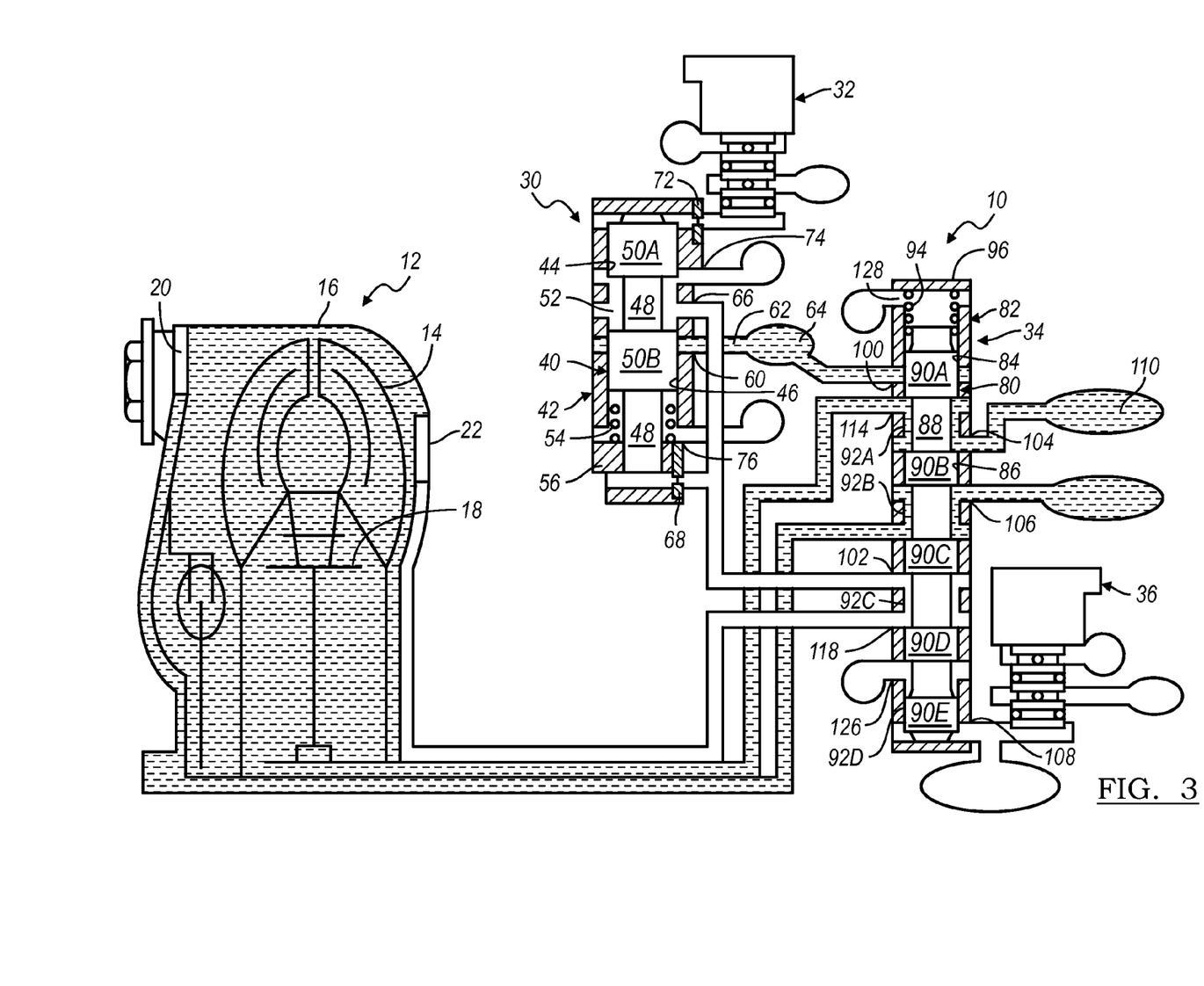
FIG. 3 is a schematic diagram of an embodiment of a hydraulic control system according to the principles of the present invention commanding a lock-up clutch released and a pump clutch applied.

In order to fully apply the pump clutch 22, the trim valve 40 is moved to the apply position, as shown in FIG. 3, by fully decreasing the output pressure from the trim solenoid 32. In this position, land 50B closes off the line pressure inlet port 60 and the fluid chamber 52 communicates with the first inlet port 66 and exhaust port 74. Accordingly, hydraulic fluid at the pump clutch 22 exhausts through the converter valve assembly 34 and the trim valve assembly 30, thereby allowing the pump clutch 22 to fully engage and transmit torque.

Figure 4:
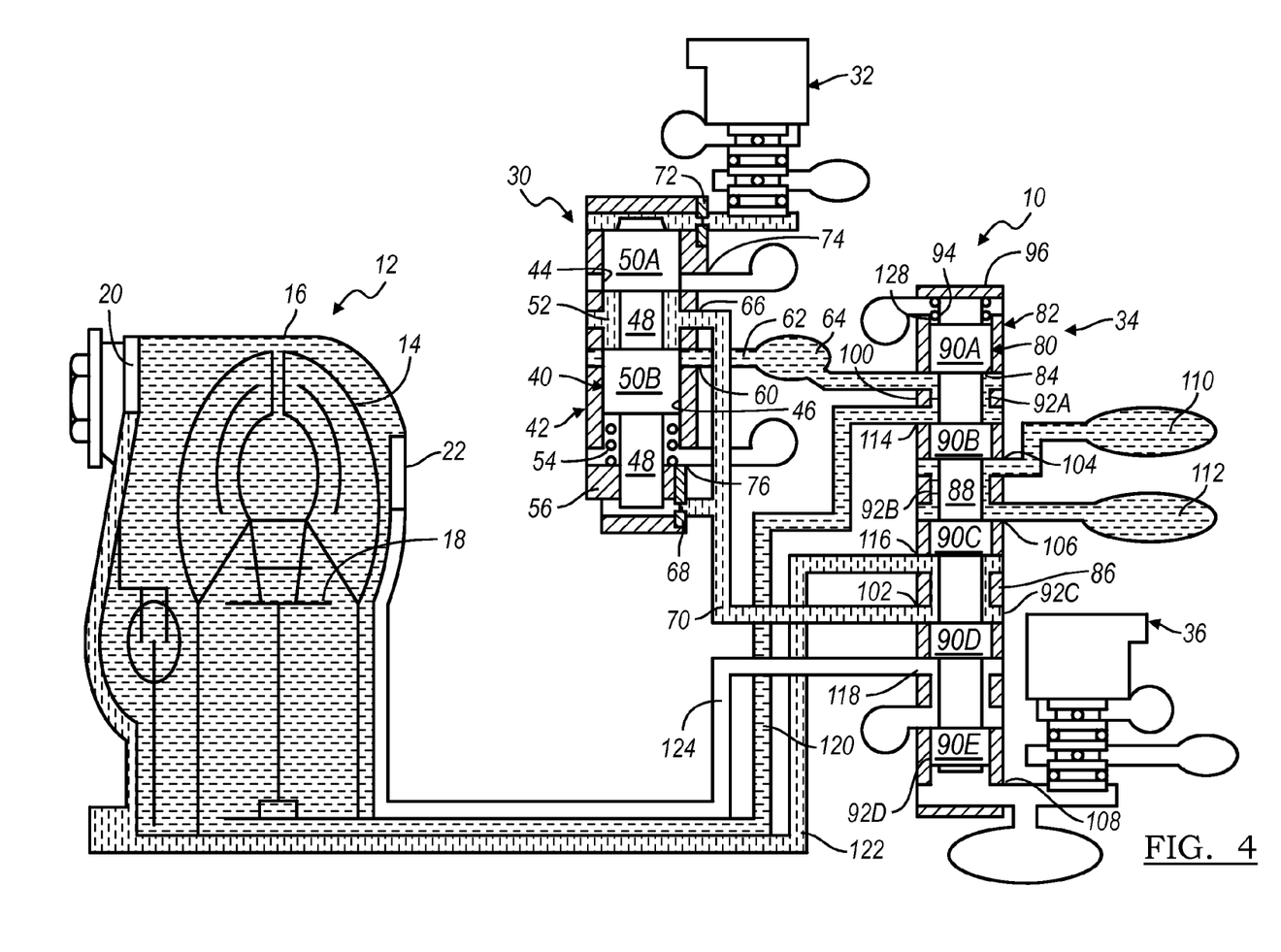
FIG. 4 is a schematic diagram of an embodiment of a hydraulic control system according to the principles of the present invention commanding a lock-up clutch trimmed and a pump clutch applied.

In order to trim the lock-up clutch 20 with the pump clutch 22 fully applied (used in electronic converter clutch control), the trim valve 40 is moved to the trim position and the converter valve 80 is moved to the second position, as shown in FIG. 4. The trim valve 40 is moved to the trim position by increasing the output pressure of the trim solenoid 32 and turning on or opening the converter solenoid 36 such that the output pressure from the converter solenoid 36 delivered to the converter solenoid inlet port 108 exceeds the force exerted by the biasing member 94. In this condition, the trim valve 40 dithers or oscillates within the bore 46 such that the fluid chamber 52 alternately communicates with both the line pressure inlet port 60 and exhaust port 74. Accordingly, the pressurized fluid flow delivered from the line pressure source 64 is reduced before exiting the first outlet port 66 when the trim valve 40 is in the trim position as a portion of the pressurized fluid flow is diverted through exhaust port 74. The first pressurized fluid flow from the pressure line fluid source 64 passes through the line pressure inlet port 60, through the fluid chamber 52, out the first outlet port 66 and the exhaust port 74, to the trim valve inlet port 102, through fluid chamber 92C, out the lock-up outlet port 116, and to the lock-up clutch 20. The first pressurized fluid flow delivered to the lock-up clutch 20 is reduced, and the lock-up clutch 20 is allowed to partially engage slip. The third pressurized fluid flow from the overage line source 112 is diverted by fluid chamber 92B to enter the coolant line source 110. Any fluid at the pump clutch 22 is diverted by land 90D such that the pump clutch outlet port 118 communicates with exhaust port 126, thereby keeping the pump clutch 22 fully applied.

Figure 5:
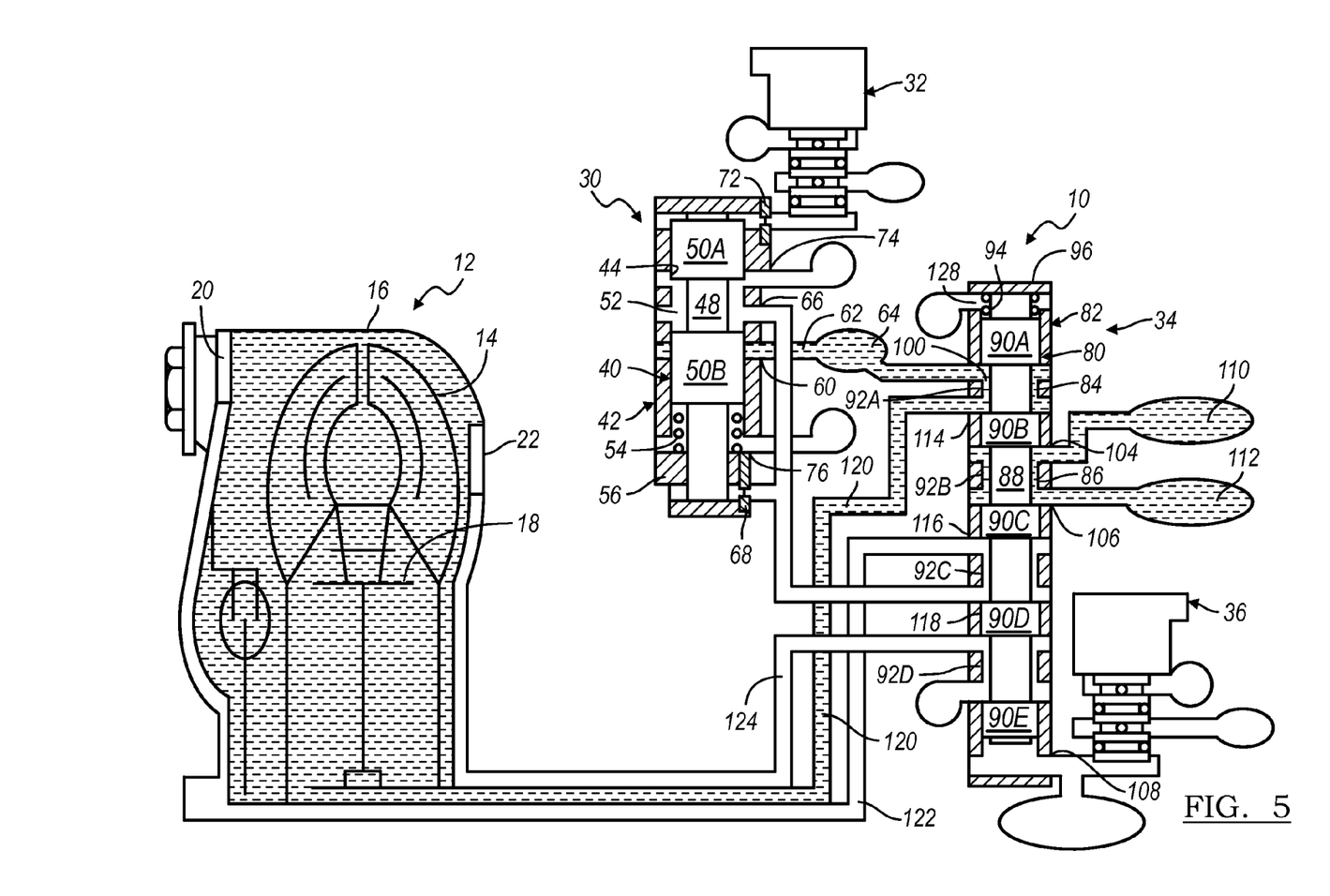
FIG. 5 is a schematic diagram of an embodiment of a hydraulic control system according to the principles of the present invention commanding a lock-up clutch and a pump clutch applied.

Finally, In order to fully apply the lock-up clutch 20, the trim valve 40 is moved to the apply position, as shown in FIG. 5, by fully decreasing the output pressure from the trim solenoid 32. In this position, land 50B closes off the line pressure inlet port 60 and the fluid chamber 52 communicates with the first inlet port 66 and exhaust port 74. Accordingly, hydraulic fluid at the lock-up clutch 20 exhausts through the converter valve assembly 34 and the trim valve assembly 30, thereby allowing the lock-up clutch 20 to fully engage and transmit torque.

Figure 6:
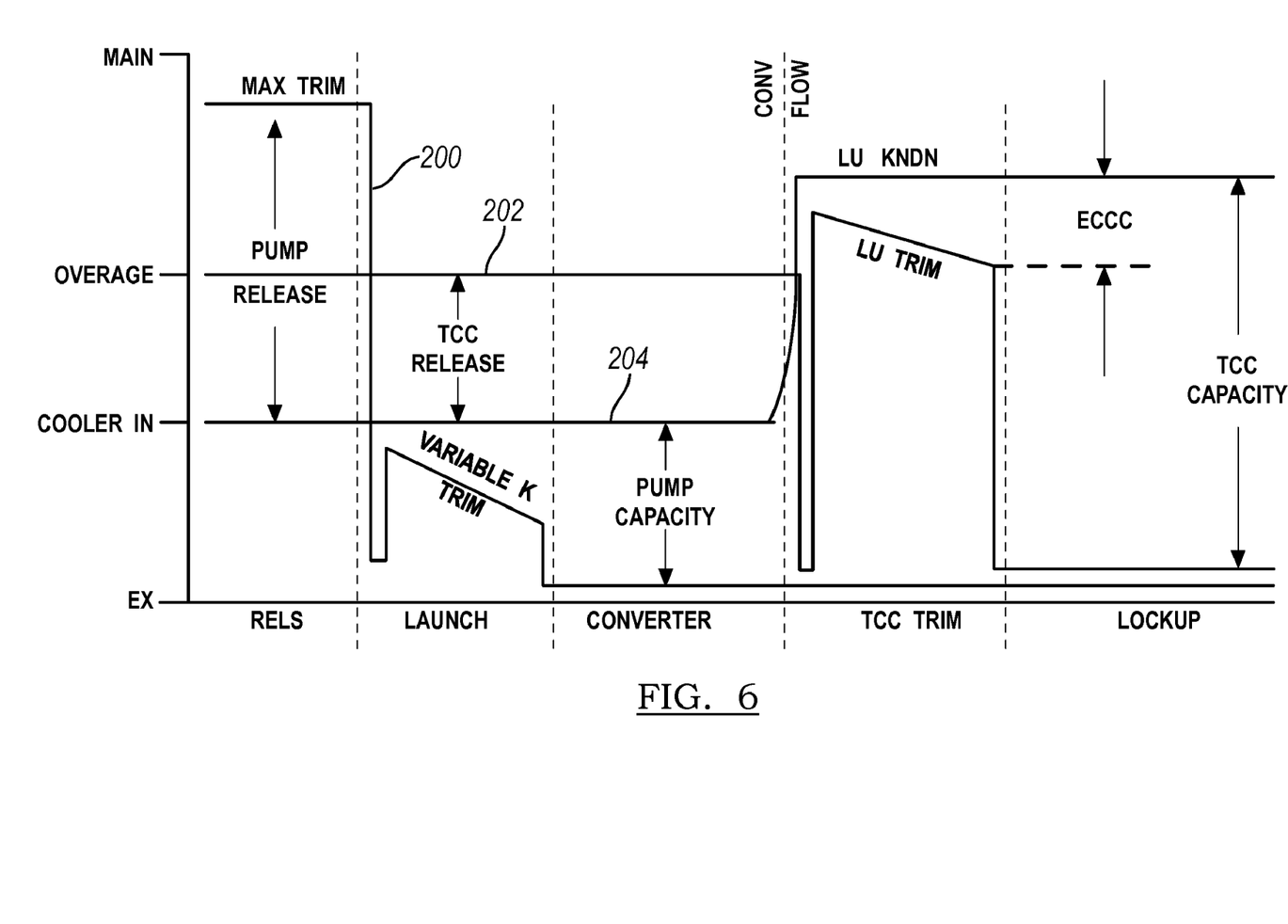
FIG. 6 is a chart illustrating pressure delivered to a torque converter using the hydraulic control system of the present invention during different stages of torque converter operation.

A summary of how the pressurized fluid flows from the main pressure line, the overage source, and the coolant source are delivered during different operating conditions, as described above, is shown in FIG. 6. The pressure delivered to the pump clutch 22 during various operating conditions is indicated by line 200. The pressure delivered to the lock-up clutch 20 during various operating conditions is indicated by line 202. The pressure delivered to the cavity of the torque converter 12 during various operating conditions is indicated by line 204.

The description of the invention is merely exemplary in nature and variations that do not depart from the gist of the invention are intended to be within the scope of the invention. Such variations are not to be regarded as a departure from the spirit and scope of the invention.

We claim the following:

1. A system for controlling a dual clutch torque converter having a first clutch and a second clutch, the system comprising:
   a source of pressurized hydraulic fluid;
   a first valve assembly having a first valve moveable between at least three positions, the first valve assembly having an inlet port in communication with the source of pressurized hydraulic fluid and having an outlet port, wherein when the first valve is in a first position the inlet port is in communication with the outlet port, when the first valve is in a second position the inlet port is in partial communication with the outlet port, and when the first valve is in a third position the inlet port is not in communication with the outlet port;
   a second valve assembly having a second valve moveable between at least two positions, the second valve assembly having a first inlet port in communication with the outlet port of the first valve assembly, a second inlet port in communication with the source of pressurized hydraulic fluid, a first outlet port in communication with the first clutch, and a second outlet port in communication with the second clutch, wherein when the second valve is in a first position the second inlet port is in communication with the first outlet port and the first inlet port is in communication with the second outlet port, and when the second valve is in a second position the first inlet port is in communication with the first outlet port;
   a first solenoid in communication with the first valve assembly and operable to selectively communicate a fluid to the first valve assembly, wherein when the fluid is in contact with the first valve of the first valve assembly the fluid moves the first valve of the first valve assembly to at least two of the first, second, and third positions; and
   a second solenoid in communication with the second valve assembly and operable to selectively communicate a fluid to the second valve assembly, wherein when the fluid is in contact with the second valve of the second valve assembly the fluid moves the second valve of the second valve assembly to at least one of the first and second positions.

2. The system of claim 1 wherein the first valve includes a first land sealed to an inner surface of the first valve assembly, and when the first valve is in the second position the first land partially blocks the inlet port thereby reducing a flow of hydraulic fluid through the first valve assembly from the source of pressurized hydraulic fluid.

3. The system of claim 2 wherein the first land is positioned between the inlet port and the outlet port when the first valve is in the third position.

4. The system of claim 3 wherein the first valve assembly further includes an exhaust port and the first valve includes a second land sealed to the inner surface of the first valve assembly, wherein the second land is positioned between the outlet port and the exhaust port when the first valve is in the first and second positions thereby preventing communication between the outlet port and the exhaust port and wherein the second land is positioned adjacent the exhaust port when the first valve is in the third position thereby allowing communication between the outlet port and the exhaust port.

5. The system of claim 1 wherein the second valve includes a first land sealed to an inner surface of the second valve assembly, and when the second valve is in the first position the first land is located between the first inlet port and the first outlet port thereby preventing a flow of hydraulic fluid from the first inlet port to the first outlet port and when the second valve is in the second position the first land is located between the second inlet port and the first outlet port thereby allowing communication between the first inlet port and the first outlet port.

6. The system of claim 5 wherein the second valve assembly further includes an exhaust port and the second valve includes a second land sealed to the inner surface of the second valve assembly, wherein the second land is positioned between the second outlet port and the exhaust port when the second valve is in the second position thereby preventing communication between the second outlet port and the exhaust port and wherein the second land is positioned between the first inlet port and the second outlet port when the second valve is in the first position thereby preventing communication between the second outlet port and the exhaust port.

7. The system of claim 1 wherein the first solenoid is a variable bleed solenoid and the second solenoid is an on/off solenoid.

8. The system of claim 1 wherein the first valve assembly includes a biasing member located at an end of the first valve, the biasing member in contact with the first valve to bias the first valve to the first position.

9. The system of claim 1 wherein the second valve assembly includes a biasing member located at an end of the second valve, the biasing member in contact with the second valve to bias the second valve to the first position.

10. The system of claim 1 wherein the second valve assembly includes a third inlet port and a third outlet port, the third inlet port in communication with the source of pressurized hydraulic fluid and the third outlet port in communication with the dual clutch torque transmitting device, and the second valve includes a third land sealingly engaged to the inner surface of the second valve assembly, wherein the third land is located between the third inlet port and the third outlet port when the second valve is in the first position thereby preventing communication between the third inlet port and the third outlet port and wherein the third land is located adjacent the third inlet port when the second valve is in the second position thereby allowing communication between the third inlet port and the third outlet port.

11. A system in a motor vehicle, the system comprising:
    a torque converter having a first clutch and a second clutch; and
    a hydraulic control system comprising:
       a source of pressurized hydraulic fluid;
       a first valve assembly having a first valve moveable between at least three positions, the first valve assembly having an inlet port in communication with the source of pressurized hydraulic fluid and having an outlet port, wherein when the first valve is in a first position the inlet port is in communication with the outlet port, when the first valve is in a second position the inlet port is in partial communication with the outlet port, and when the first valve is in a third position the inlet port is not in communication with the outlet port;
       a second valve assembly having a second valve moveable between at least two positions, the second valve assembly having a first inlet port in communication with the outlet port of the first valve assembly, a second inlet port in communication with the source of pressurized hydraulic fluid, a first outlet port in communication with the first clutch, and a second outlet port in communication with the second clutch, wherein when the second valve is in a first position the second inlet port is in communication with the first outlet port and the first inlet port is in communication with the second outlet port, and when the second valve is in a second position the first inlet port is in communication with the first outlet port;

a first solenoid in communication with the first valve assembly and operable to selectively communicate a fluid to the first valve assembly, wherein when the fluid is in contact with the first valve of the first valve assembly the fluid moves the first valve of the first valve assembly to at least two of the first, second, and third positions; and a second solenoid in communication with the second valve assembly and operable to selectively communicate a fluid to the second valve assembly, wherein when the fluid is in contact with the second valve of the second valve assembly the fluid moves the second valve of the second valve assembly to at least one of the first and second positions, and wherein fluid flow from the source of pressurized hydraulic fluid is communicated through the first valve assembly to the second valve assembly when the first valve is in the first position, fluid flow from the source of pressurized hydraulic fluid is partially communicated through the first valve assembly to the second valve assembly when the first valve is in the second position, and fluid flow from the source of pressurized hydraulic fluid is prevented from communicating through the first valve assembly to the second valve assembly when the first valve is in the third position, and wherein fluid flow from the source of pressurized hydraulic fluid is communicated to the first clutch when the second valve is in the first position and pressurized hydraulic fluid flow is communicated to the second clutch when the second valve is in the second position.

12. The system of claim 11 wherein the first valve includes a first land sealed to an inner surface of the first valve assembly, and when the first valve is in the second position the first land partially blocks the inlet port thereby reducing a flow of hydraulic fluid through the first valve assembly from the source of pressurized hydraulic fluid.

13. The system of claim 12 wherein the first land is positioned between the inlet port and the outlet port when the first valve is in the third position.

14. The system of claim 13 wherein the first valve assembly further includes an exhaust port and the first valve includes a second land sealed to the inner surface of the first valve assembly, wherein the second land is positioned between the outlet port and the exhaust port when the first valve is in the first and second positions thereby preventing communication between the outlet port and the exhaust port and wherein the second land is positioned adjacent the exhaust port when the first valve is in the third position thereby allowing communication between the outlet port and the exhaust port.

15. The system of claim 11 wherein the second valve includes a first land sealed to an inner surface of the second valve assembly, and when the second valve is in the first position the first land is located between the first inlet port and the first outlet port thereby preventing a flow of hydraulic fluid from the first inlet port to the first outlet port and when the second valve is in the second position the first land is located between the second inlet port and the first outlet port thereby allowing communication between the first inlet port and the first outlet port.

16. The system of claim 15 wherein the second valve assembly further includes an exhaust port and the second valve includes a second land sealed to the inner surface of the second valve assembly, wherein the second land is positioned between the second outlet port and the exhaust port when the second valve is in the second position thereby preventing communication between the second outlet port and the exhaust port and wherein the second land is positioned between the first inlet port and the second outlet port when the second valve is in the first position thereby preventing communication between the second outlet port and the exhaust port.

17. The system of claim 11 wherein the first solenoid is a variable bleed solenoid and the second solenoid is an on/off solenoid.

18. The system of claim 11 wherein the first clutch is a lock up clutch operable to couple a pump in the torque converter with an output of the torque converter and the second clutch is a pump clutch operable to couple an output of an engine in the motor vehicle with the pump in the torque converter.

19. The system of claim 11 wherein the second valve assembly includes a third inlet port and a third outlet port, the third inlet port in communication with the source of pressurized hydraulic fluid and the third outlet port in communication with the dual clutch torque transmitting device, and the second valve includes a third land sealingly engaged to the inner surface of the second valve assembly, wherein the third land is located between the third inlet port and the third outlet port when the second valve is in the first position thereby preventing communication between the third inlet port and the third outlet port and wherein the third land is located adjacent the third inlet port when the second valve is in the second position thereby allowing communication between the third inlet port and the third outlet port.

* * * * *